United States Patent
Kim et al.

(10) Patent No.: US 8,420,273 B2
(45) Date of Patent: Apr. 16, 2013

(54) SEALING STRUCTURE FOR POLYMER ELECTROLYTE FUEL CELL

(75) Inventors: Ho-Suk Kim, Seoul (KR); Mee-Nam Shinn, Seongnam-si (KR); Byung-Sun Hong, Yongin-si (KR); Sung-Jin Oh, Seoul (KR); Cheol-Nam Yang, Suwon-si (KR); Yong-Jung Seo, Gyeonggi-do (KR)

(73) Assignee: Fuelcellpower Co., Ltd., Seongnam-si (KR)

( * ) Notice: Subject to any disclaimer, the term of this patent is extended or adjusted under 35 U.S.C. 154(b) by 1829 days.

(21) Appl. No.: 10/542,642

(22) PCT Filed: Jun. 23, 2003

(86) PCT No.: PCT/KR03/01226
§ 371 (c)(1),
(2), (4) Date: Jul. 19, 2005

(87) PCT Pub. No.: WO2004/107488
PCT Pub. Date: Dec. 9, 2004

(65) Prior Publication Data
US 2006/0068263 A1   Mar. 30, 2006

(30) Foreign Application Priority Data
Jun. 2, 2003   (KR) .................. 10-2003-0035241

(51) Int. Cl.
*H01M 2/38* (2006.01)
*H01M 2/40* (2006.01)
*H01M 8/24* (2006.01)

(52) U.S. Cl.
USPC ........................ 429/460; 429/457; 429/463

(58) Field of Classification Search ............ 429/34, 429/457, 460, 463
See application file for complete search history.

(56) References Cited

U.S. PATENT DOCUMENTS

| 4,533,455 A | 8/1985 | Balko et al. |
| 6,261,711 B1 * | 7/2001 | Matlock et al. ............. 429/34 |

(Continued)

FOREIGN PATENT DOCUMENTS

| DE | 101 21 176 A1 | 2/2002 |
| EP | 1 416 555 A1 | 5/2004 |

(Continued)

OTHER PUBLICATIONS

International Preliminary Examination Report issued in International Application No. PCT/KR2003/001226 on Sep. 27, 2005.

(Continued)

*Primary Examiner* — Ula C Ruddock
*Assistant Examiner* — Patricia Davis
(74) *Attorney, Agent, or Firm* — Finnegan, Henderson, Farabow, Garrett & Dunner, L.L.P.

(57) ABSTRACT

The present invention relates to a sealing structure for polymer electrolyte fuel cell, which comprises a bipolar plate with sealing groove to be filled with rubber using a dispenser, and a gasket interposed between the bipolar plate and a membrane electrode assembly. That is, according to the present invention, the thickness deviation in a gasket can be softened by interposing a gasket between a rubber ands a membrane electrode assembly after filling rubber in a sealing groove formed on a bipolar plate using a dispenser. Also, nonuniform stress distribution can be resolved because a gasket covers with a pressure despite the height deviation of rubber, and a stress is not directly transmitted to a membrane electrode assembly and dispersed by a gasket despite nonuniform stress distribution.

9 Claims, 6 Drawing Sheets

U.S. PATENT DOCUMENTS

| | | | |
|---|---|---|---|
| 6,337,120 B1 * | 1/2002 | Sasaki et al. | 428/66.4 |
| 6,338,492 B1 * | 1/2002 | Schilling et al. | 277/630 |
| 6,440,597 B1 | 8/2002 | Mizuno | |
| 6,699,613 B2 | 3/2004 | Inoue et al. | |
| 2001/0019791 A1 | 9/2001 | Gooch et al. | |
| 2002/0055027 A1 | 5/2002 | Inoue et al. | |
| 2002/0055032 A1 | 5/2002 | Wakahoi et al. | |
| 2002/0106954 A1 * | 8/2002 | Sakumoto | 442/104 |
| 2003/0031914 A1 | 2/2003 | Frank et al. | |

FOREIGN PATENT DOCUMENTS

| | | |
|---|---|---|
| JP | 2002-042835 | 2/2002 |
| JP | 2002-246044 | 8/2002 |
| JP | 2003-17093 | 1/2003 |
| WO | WO 03/007408 A1 | 1/2003 |

OTHER PUBLICATIONS

Search Report from the European Patent Office, dated Jul. 16, 2007, in counterpart European Patent Application No. 03817081.7-2119.

Office Action issued from the Japanese Patent Office on Mar. 16, 2009, in counterpart Japanese Patent Application No. 2005-500258.

Invitation Pursuant to Article 94(3) and Rule 71(1) EPC issued by European Patent Office dated Jul. 20, 2010, for European Application No. 03817081.7, 3 pages.

* cited by examiner

SEALING STRUCTURE FOR POLYMER ELECTROLYTE FUEL CELL

FIELD OF THE INVENTION

The present invention relates to a sealing structure for polymer electrolyte fuel cell, and more particularly to the sealing structure for polymer electrolyte fuel cell to prevent reaction gas or coolant etc. from leaking through the commissure between a bipolar plate and a membrane electrode assembly.

BACKGROUND OF THE INVENTION

In general, a polymer electrolyte fuel cell generates electricity and heat by electrochemically reacting a fuel gas containing hydrogen and an oxidizer gas containing oxygen. The polymer electrolyte fuel cell is capable of working at a low temperature of 70-80° C. and of maintaining great current density. In these reasons, the polymer electrolyte fuel cell has fast startup performance, can be miniaturized, and can be made into light weight cells, thus suitable for use in such applications as portable power source, power source for vehicles, residential equipments of steam supply and power generation, etc.

FIG. 1 illustrates an embodiment of the polymer electrolyte fuel cell, which comprises a membrane electrode assembly (MEA, 10) comprising a polymer electrolyte membrane and an electrode, a gas diffusion layer (fluid distribution layer, 12) delivering the gas used in a reaction to the electrode and discharging the reaction products, a conductive bipolar plate (separator, 14) supplying a reaction gas and a coolant from outside and separating oxidized electrode (anode) from deoxidized electrode (cathode), and the like. A fuel cell is composed by stacking these membrane electrode assembly, gas diffusion layer and bipolar plate as many as necessary, and the stack forms a single body with an appropriate pressure given from outside by a equipment, so each unit cell is not out of line or slipped.

Also, a number of manifolds (20) are formed in the upper part and the lower part of the membrane electrode assembly (10) and the bipolar plate (14) for supplying or discharging hydrogen, oxygen needed in a reaction, and coolant needed to cool the reaction heat. And hydrogen, oxygen and coolant supplied from outside are taken into the electrode passing through a pipe outside the stack, the manifold of the bipolar plate, and a gas-flow path formed on the bipolar plate of each unit cell.

On the other hand, a sealing means should be included to prevent hydrogen, oxygen and coolant from leaking from each manifold and the reaction site where hydrogen and oxygen react. However, in the fuel cell, often stopping are repeated by its own characteristics, and expansion and contraction are frequently occurred during the fuel cell operation because of the heat generated by the chemical reaction. Therefore, a sealing structure for the fuel cell must exert sealing performance in the case of frequent expansion and contraction, and only if the stress distribution arising in each element of fuel cell in expansion and contraction is as uniform as possible, the fatigue failure can be prevented.

For this, a gasket is disposed around the electrode and manifold. As a gasket for sealing the fuel cell, silicon sheet or Teflon sheet strengthened by glass fibers is often used because of its easy manufacturing advantage and little thickness deviation.

This strengthened silicon sheet or Teflon sheet has an excellent mechanical strength supported by internal glass fibers, so it can exert mechanical toughness under the excessive pressure in the time when a stack is bound. But the rate of contraction and restoration are not so high that, when the fuel cell operates, gas is apprehended to leak for the expansion of parts by heat and water Moreover gas can leak through the surface of the gasket because the surface is rough and the material is relatively hard.

Another defect is that, if formed thicker than a gas diffusion layer when a stack is bound, the resistance increases because the mechanical strength is greater than that of a carbon paper or a carbon cloth generally used as a gas diffusion layer, and the contact between a gas diffusion layer and a bipolar plate is not tight. On the contrary, there is a problem that, if formed too thin, gas leaks because the pressure on the surface of the gasket is not enough. Therefore it is difficult to determine the proper thickness.

Another way for sealing the fuel cell is to use rubber with superior elastic restitution force and soft property containing silicon, fluorine or olefin as a material of a gasket. There are the way of manufacturing a gasket in the shape of O-ring using a metal mold, the way of jet molding with a metal mold being placed directly on a bipolar plate, and the way of manufacturing a gasket using a dispenser, etc in the way of manufacturing a gasket of rubber.

The way of manufacturing a gasket in the shape of O-ring using a metal mold has the defect that, after manufacturing a gasket, it must be placed on the surface of a bipolar plate one by one when a stack is bound. And the way of jet molding with a metal mold being placed directly on a bipolar plate has the defect that, in the time of manufacturing a gasket, the shape and the dimension of a metal mold must be same with the gasket.

Also, the conventional way of manufacturing a gasket using a dispenser is the way of putting sealant in an injector and the like and pressing it, so has the problem that the height of rubber at starting point and ending point cannot be set uniformly. That is, the liquid state of rubber material is filled along a route of a sealing groove using a dispenser operated by X-Y axis robot, after forming the sealing groove in advance on a bipolar plate, with a width and a depth. The rubber overlaps in ending point with that of starting point, so height become greater than that of other part.

Hereby the pressure of the surface on the bipolar plate and the membrane electrode assembly become nonuniform when a stack is bound, so not only sealing performance is lowered but also the life span of fatigue failure is shortened by this nonuniform stress distribution when used in the case of long term repeatedly.

SUMMARY OF THE INVENTION

The present invention was invented to overcome the defects of conventional technologies, and it is an object of the present invention to provide a sealing structure for polymer electrolyte fuel cell whose structure not only does not lower the sealing performance although the thickness deviation of a gasket occurs, but also can disperse nonuniform stress distribution onto a bipolar plate and a membrane electrode assembly.

It is another object of the present invention to provide a sealing structure for polymer electrolyte fuel cell wherein rubber can be filled in a sealing groove formed on a bipolar plate using a dispenser comparatively easy to handle, to have entirely uniform height, to improve sealing performance by preventing the nonuniform pressure on a surface, and to extend the life span of products.

To solve above technical problem, the present invention comprises a bipolar plate with sealing groove to be filled with rubber using a dispenser; and a gasket interposed between the bipolar plate and a membrane electrode assembly.

That is, according to the present invention, the thickness deviation in a gasket can be softened by interposing a gasket between a rubber and a membrane electrode assembly after filling rubber in a sealing groove formed on a bipolar plate using a dispenser. Also, nonuniform stress distribution can be resolved because a gasket covers with a pressure despite the height deviation of rubber, and a stress is not directly transmitted to a membrane electrode assembly and dispersed by a gasket despite nonuniform stress distribution.

It is desirable that the sealing groove is formed in the perimeter of the reaction site of bipolar plate, and the perimeter of the manifold of hydrogen, oxygen and coolant as well.

On the other hand, in the case of using a dispenser, because the difference of height between at starting point and at ending point is relatively greater than that of other parts, it is desirable to further comprise an anchor in contact with the sealing groove, whose width is greater than the width of the sealing groove.

That is, by filling rubber by controlling a dispenser to start from the anchor and end in the anchor, the height of starting point and ending point can be uniform. And the width of the anchor is wide enough, although the height increases temporarily by the partial overlapping of starting point with ending point, the height becomes uniform by the diffusing of rubber right and left.

It is preferable that the anchor has a width of 1.5 times of the width of the sealing groove. Thereby, damaging the sealing performance, with the rubber being diffused excessively and thinner than that of sealing groove, can be prevented effectively.

Also, it is desirable that the sealing groove and the anchor have same depth, for a dispenser to move at uniform speed. Because, in the case that the depth of an anchor is different from the depth of sealing groove, the nonuniform moving speed of a dispenser can be brought about to fill up to the surface of groove.

On the other hand, an anchor can be located anywhere only if it is contacted with the sealing groove. That is, by expanding the partial width of sealing groove right and left, an anchor can be formed. But, it is more desirable that the anchor is formed vertically to a route direction of the sealing groove in the periphery of the sealing groove.

That is, on the characteristic of working, the height of rubber filled in an anchor portion is greater than the height of rubber filled in a sealing groove portion, and when the bipolar plate is bound to a fuel cell stack relatively more force is given to the perimeter of a bipolar plate than inner part. Therefore, by forming an anchor in the periphery of sealing site, the pressure given to the perimeter can be absorbed effectively, and consequently the pressure given to the entire bipolar plate can be distributed uniformly. In this respect, it is more desirable that the anchors on each of the bipolar plate located in the front and the rear of said membrane electrode assembly, are located symmetrically to each other when a fuel cell bound to a stack.

On the other hand, the rubber is made of any of rubber materials containing silicon, fluorine or olefin.

Also, it is desirable that the gasket is manufactured of the same material with the bipolar plate by this the deformation and nonuniform stress distribution caused by the difference of heat expansion rate can be prevented.

Also, the present invention includes a polymer electrolyte fuel cell comprising the sealing structure above-mentioned.

DETAILED DESCRIPTION OF THE INVENTION

Hereinafter, an embodiment of polymer electrolyte fuel cell according to the present invention will be described in more detail with reference to the accompanying drawings. Also, in the present invention, the basic functional principle and process of fuel cell are same with that of conventional things, so the explanation for these is omitted.

Figure 1:
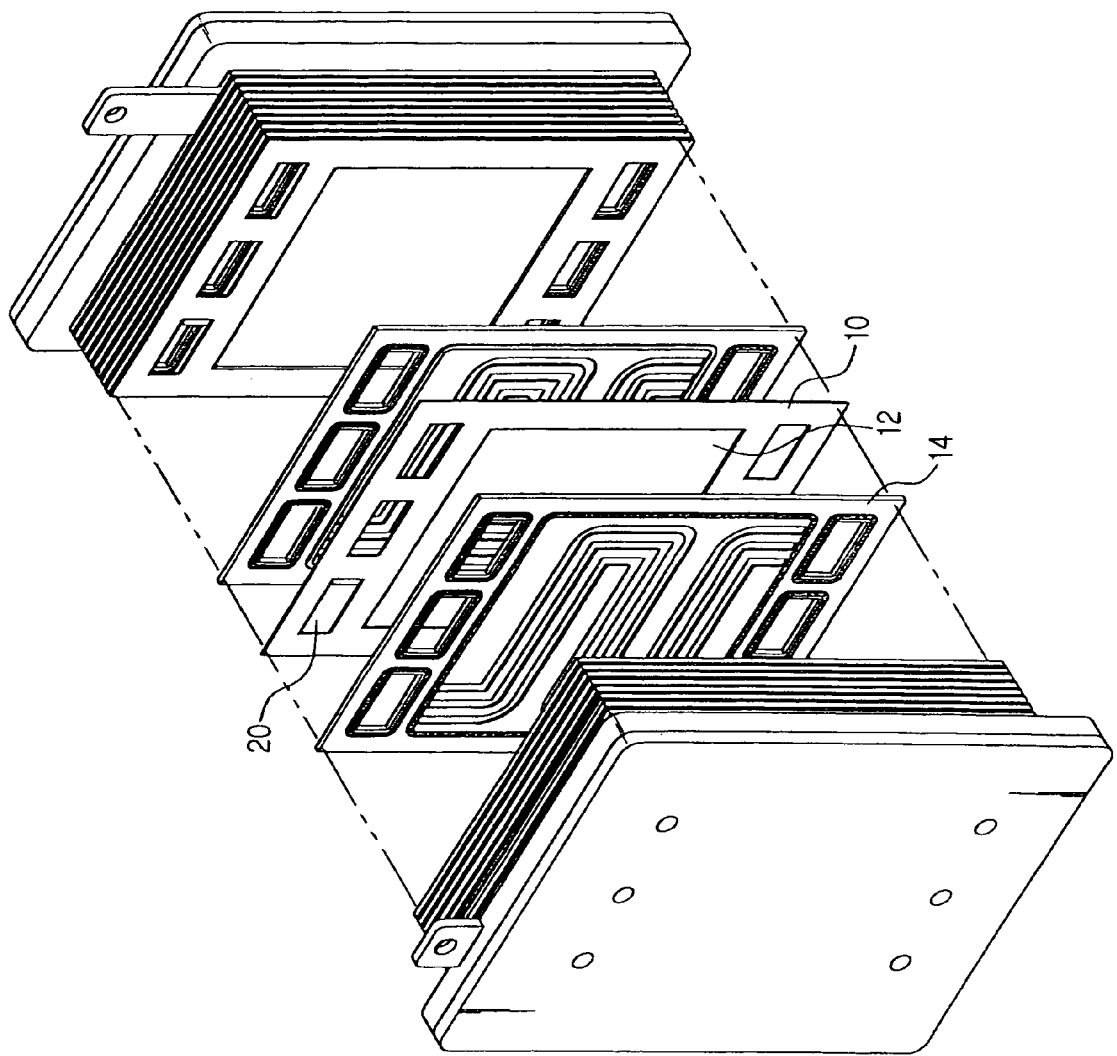
FIG. 1 is an exploded perspective view for illustrating general structure of polymer electrolyte fuel cell.
Figure 2:
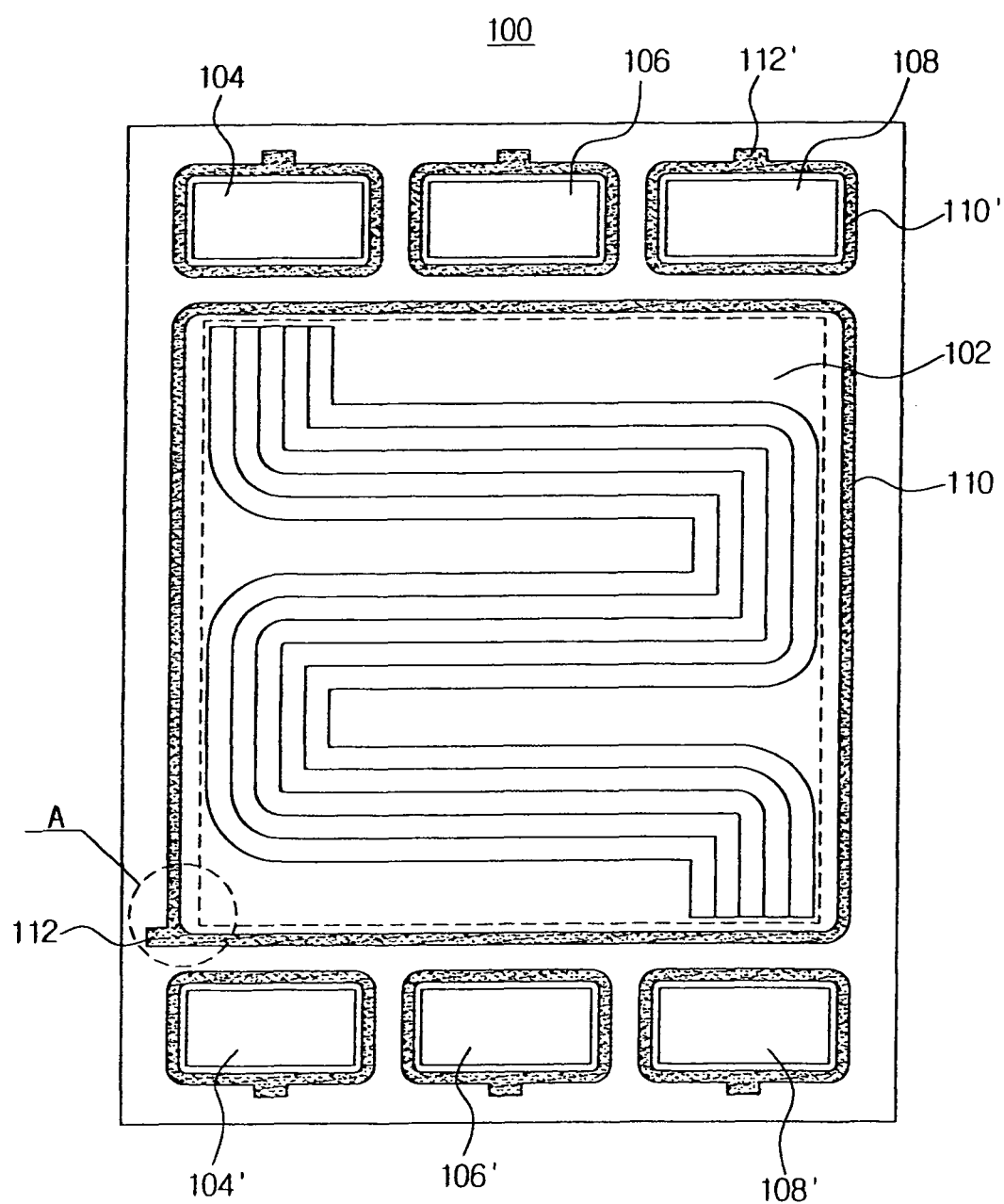
FIG. 2 is a front side elevation view illustrating bipolar plate in an embodiment of sealing structure of polymer electrolyte fuel cell according to the present invention.

Referring to FIG. 2, in the central part of Bipolar plate 100 of the embodiment, a reaction site 102 where hydrogen reacts with oxygen is formed, in the upper part manifold 104, 106, 108 are formed where each of hydrogen, oxygen and coolant is supplied. Also, in the lower part manifold 104', 106', 108' to discharge each of coolant, oxygen and hydrogen are formed.

The Bipolar plate 100 plays the role that hydrogen and oxygen do not mixed in a fuel cell, and that membrane electrode assembly is connected electrically, and functions as mechanical supporter of stacked unit cells. Also it functions that reaction gas flows to electrode evenly, membrane is not dry through adequate water management, and water created in deoxidation electrode is discharged. As the material of bipolar plate 100 graphite or carbon composite can be used, and also metallic plate is used. In the case of metallic plate is used, it can be eroded so it is necessary to coat the surface with high-conductive, anticorrosive material. In this embodiment carbon composite is used as bipolar plate 100.

Figure 3:
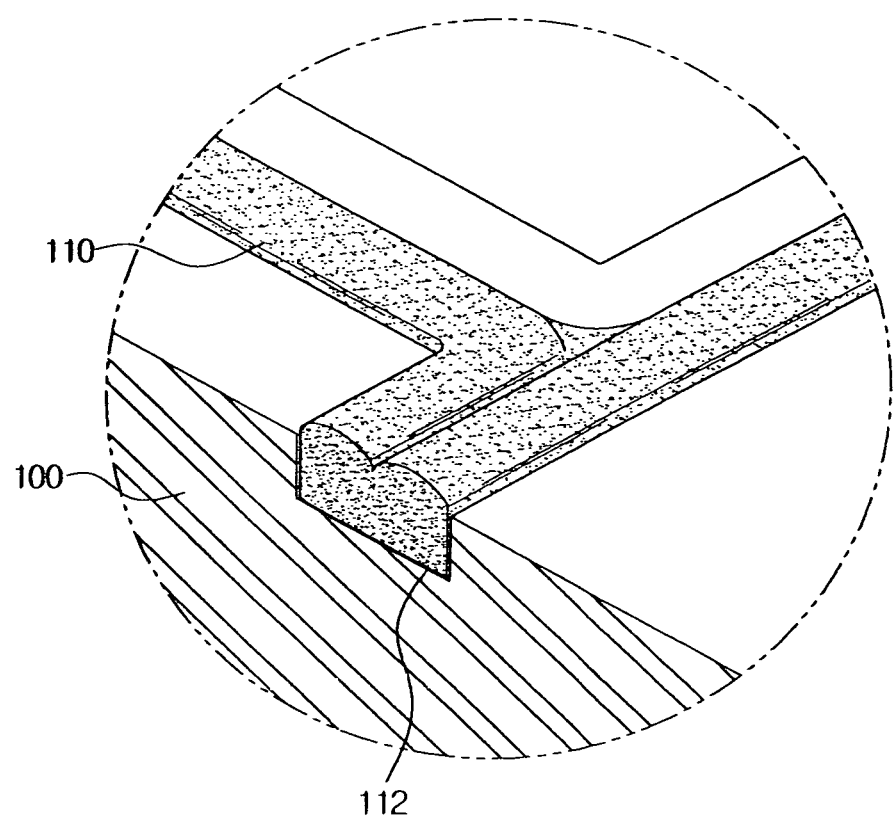
FIG. 3 is a perspective view illustrating A portion in FIG. 2 enlarged.

On the other hand, in the perimeter of the reaction site and each manifold, sealing grooves 110, 110' are formed, in FIG. 2 and FIG. 3 the sealing grooves filled with rubber are illustrated. Here, in the lower left part of the sealing groove 110 located in a reaction site, the anchor 112 which has the width of 1.5 times of the width of the sealing groove 110 is formed to be extended toward the outside of bipolar plate 100. The sealing groove and the anchor can be formed by CNC processing or press metallic pattern etc., the sealing groove 110 is formed to have the depth of 0.3 mm and the width of 2 mm in the illustrated embodiment, and the anchor 112 is formed to have the depth of 0.3 mm and the width of 3 mm. In this time, rubber is discharged from a dispenser (not illustrated) with the width of 1.2 mm and the height of 0.60 mm. That is, rubber is filled in a sealing groove in the state of partially projected from the surface of bipolar plate, and the definite dimension of a sealing groove and an anchor is changeable according to the required capacity and the size of fuel cell.

As illustrated in FIG. 3, if the filling work of rubber start from the anchor 112 and finish in the anchor 112, because the anchor is formed widely enough, although the height of rubber filled in is nonuniform, it is diffused right and left, the starting point overlap with the ending point, and the height of the rubber becomes uniform.

After rubber is filled in a sealing groove and an anchor, if bipolar plate is heat-treated in the oven of 100° C. for 30 minutes, liquid rubber dried into solid. On the other hand, rubber is filled in the perimeter of the hydrogen, oxygen and coolant manifold as well in the same way with above.

Figure 4:
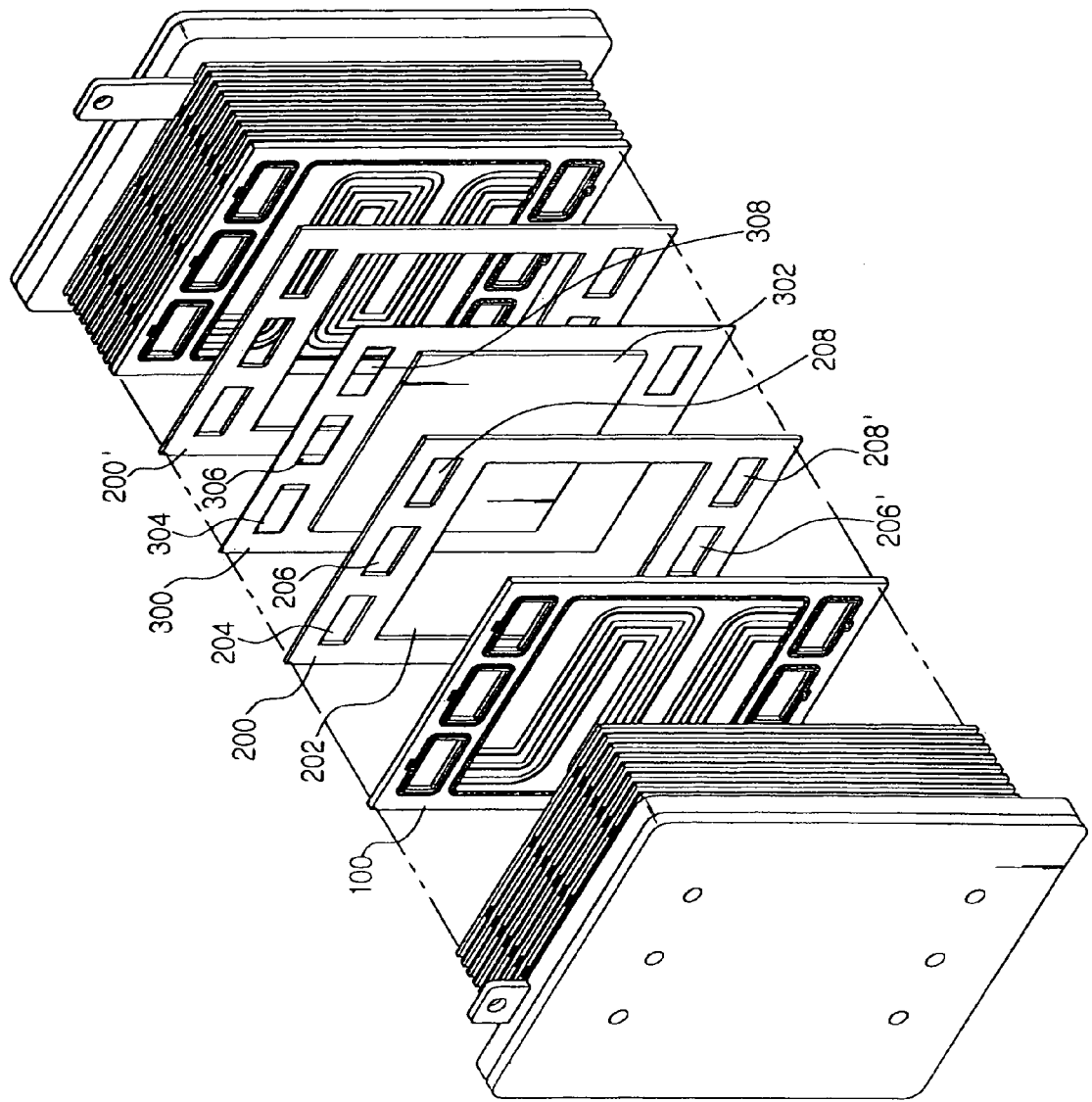
FIG. 4 is a view equivalent to FIG. 1 illustrating polymer electrolyte fuel cell applied to by bipolar plate illustrated in FIG. 2.
Figure 5:
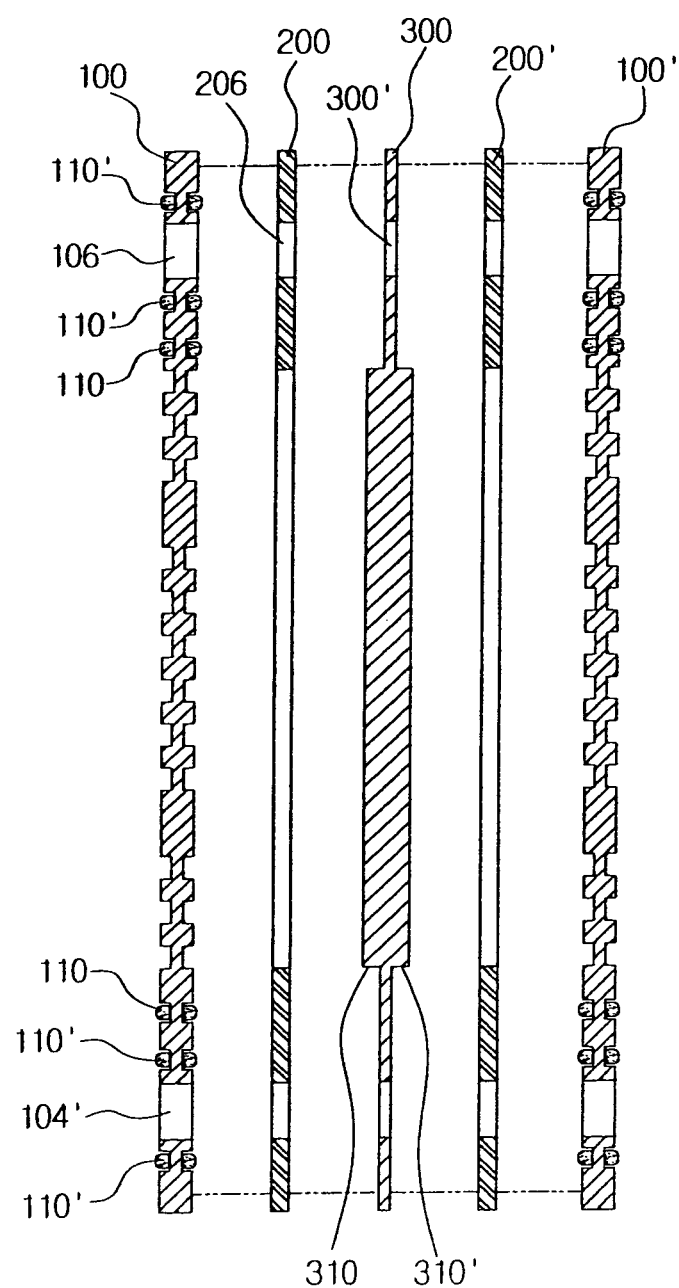
FIG. 5 is a vertical cross section view illustrating the pre-assembled state of polymer electrolyte fuel cell illustrated in FIG. 4.
Figure 6:
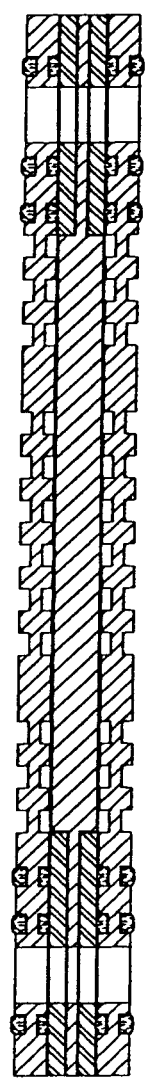
FIG. 6 is a vertical cross section view illustrating the assembled state of polymer electrolyte fuel cell illustrated in FIG. 5.

Referring to FIG. 4-6, ordinary membrane electrode assembly 300 is located in the center of a fuel cell using above bipolar plate 100, a couple of gasket 200, 200' are in contact with the front and rear side of membrane electrode assembly 300, bored in the portion of 202, 204, 206, 208, 206', 208' each corresponding to the reaction site 102, hydrogen, oxygen and coolant manifold 104, 106, 108, 104', 106', 108', and a couple of the bipolar plate 100, 100' are adhered to the outside.

A couple of gas diffusion layer. 310, 310' are adhered to the central front and rear side of the membrane electrode assembly 300, and the edge of the portion 202 of the gasket 200 corresponding to reaction site is adhered to, in contact, the side of the gas diffusion layer 310, so membrane electrode assembly 300 function as structural supporter to uniform the entire thickness. Above hydrogen, oxygen and coolant manifold 304, 306, 308 are formed in the upper and lower part of membrane electrode assembly 300.

In FIG. 5 the rubber 110, 110' is projected from the surface in a certain amount, but in the assembled state illustrated in FIG. 6 the rubber maintains the state of pressed and adhered by the surface of the gasket 200, so the leakage can be prevented by the rubber although the thickness of gasket is nonuniform. Also, not because the stress given by the counter-force from the press of rubber is not directly transmitted to membrane electrode assembly, but because it is transmitted uniformly diffused through the gasket, the deformation and the destruction by nonuniform stress distribution is prevented.

Industrial Applicability

According to the present invention comprised as above mentioned, not only sealing performance is highly improved because a rubber and a gasket seal doubly, but also in the case the surface of rubber or gasket is nonuniform it is buffered and supplemented by the interaction, it is a merit that if used for long term repeatedly, initial sealing performance can be maintained as it is.

That is, although the deviation is occurred in the thickness of a gasket, it is in contact with the rubber partially projected from a bipolar plate, and the minuteness can be lowered in the time of gasket processing, so not only manufacturing cost can be reduced but also design can be accomplished more flexibly. And, in the case that the surface of rubber discharged by a dispenser is nonuniform, not only perfect sealing is possible because it is assembled in the state that the surface of a gasket is compressed but also the problem by nonuniform stress distribution can be minimized because the stress generated by rubber, even if not uniform, is transmitted to membrane electrode assembly diffused through gasket.

Also, by setting up an anchor in a part of a sealing groove filled with rubber, there is an effect that not only height deviation in the starting point and the ending point of rubber filled by a dispenser can be minimized, but also production cost can be reduced by reducing the loss of the rubber material.

What is claimed is:

1. A sealing structure for polymer electrolyte fuel cell having a membrane electrode assembly, the sealing structure comprising:
    a bipolar plate including a sealing groove and an anchor groove coupled to a periphery of the sealing groove, the sealing groove surrounding at least one of a reaction site or a manifold formed on the bipolar plate, the anchor groove extending toward an outer edge of the bipolar plate, and a width of the anchor groove being greater than a width of the sealing groove;
    a sealing member formed of rubber and positioned in the sealing groove and the anchor groove; and
    a gasket plate interposed between the bipolar plate and the membrane electrode assembly, wherein the sealing member is formed by drying liquid rubber, the liquid rubber filling in the sealing groove by controlling a dispenser to start from the anchor groove and finish in the anchor groove by way of the sealing groove.

2. The sealing structure as in claim 1, wherein the width of the anchor groove is 1.5 times greater than the width of the sealing groove.

3. The sealing structure as in claim 2, wherein a depth of the sealing groove is equal to a depth of the anchor groove.

4. The sealing structure as in claim 1, wherein the anchor groove is formed extending from the periphery of the sealing groove along a direction perpendicular to the periphery of the sealing groove.

5. The sealing structure as in claim 1, further comprising an opposed bipolar plate having an opposed anchor groove, wherein the bipolar plate and the opposed bipolar plate are disposed on opposite sides of the membrane electrode assembly.

6. The sealing structure as in claim 1, wherein the rubber comprises a rubber material containing at least one of silicon, fluorine, or olefin.

7. The sealing structure as in claim 1, wherein the gasket plate comprises the same material as the bipolar plate.

8. A polymer electrolyte fuel cell comprising said sealing structure stated in any of claims 1 and 2-7.

9. The sealing structure of claim 5, wherein the opposed anchor groove is formed on the opposed bipolar plate at a location symmetric with respect to the anchor groove of the bipolar plate.

\* \* \* \* \*